(12) United States Patent
Park et al.

(10) Patent No.: US 8,274,198 B2
(45) Date of Patent: Sep. 25, 2012

(54) ULTRASONIC MOTOR AND CONVEYING APPARATUS HAVING THE SAME

(75) Inventors: Sunghyuk Park, Seoul (KR); Jin-woo Cho, Seongnam-si (KR); Ji-hyuk Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 222 days.

(21) Appl. No.: 12/574,939

(22) Filed: Oct. 7, 2009

(65) Prior Publication Data

US 2010/0084946 A1  Apr. 8, 2010

(30) Foreign Application Priority Data

Oct. 7, 2008  (KR) .................. 10-2008-0098397

(51) Int. Cl.
*H02N 2/12* (2006.01)
(52) U.S. Cl. .......... 310/323.03; 310/323.01; 310/323.13
(58) Field of Classification Search .............. 310/323.01–323.21, 328
See application file for complete search history.

(56) References Cited

U.S. PATENT DOCUMENTS

| 4,645,964 A * | 2/1987 | Hiramatsu et al. ....... 310/323.06 |
| 4,882,500 A | 11/1989 | Iijima |
| 5,172,023 A * | 12/1992 | Kawai et al. ............. 310/323.04 |
| 5,274,294 A | 12/1993 | Kimura et al. |
| 5,596,241 A | 1/1997 | Seki et al. |
| 2003/0201695 A1* | 10/2003 | Funakubo et al. ....... 310/323.01 |
| 2007/0188051 A1* | 8/2007 | Kobayashi et al. ...... 310/323.11 |

FOREIGN PATENT DOCUMENTS

| EP | 1087514 A2 | 3/2001 |
| JP | 471371 A | 3/1992 |
| JP | 4-178179 A | 6/1992 |

OTHER PUBLICATIONS

Communication dated Mar. 8, 2012 from the European Patent Office in counterpart European application No. 09171998.9.

* cited by examiner

*Primary Examiner* — Derek Rosenau
(74) *Attorney, Agent, or Firm* — Sughrue Mion, PLLC

(57) ABSTRACT

An ultrasonic motor includes a fixed member including a surface, a movable member positioned to face the surface of the fixed member, and an actuator to cause at least a portion of the movable member to contact the surface of the fixed member and cause the movable member to move relative to the fixed member.

35 Claims, 12 Drawing Sheets

ULTRASONIC MOTOR AND CONVEYING APPARATUS HAVING THE SAME

CROSS-REFERENCE TO RELATED PATENT APPLICATION

This application claims benefit from Korean Patent Application No. 10-2008-98397 filed on Oct. 7, 2008 in the Korean Intellectual Property Office, the entire disclosure of which is incorporated herein by reference.

BACKGROUND

1. Field

Apparatuses consistent with the present invention relate to an ultrasonic motor and a conveying apparatus having the same, and more particularly, to an ultrasonic motor, which can obtain high torque efficiency while having a simplified structure, and a conveying apparatus having the same.

2. Description of the Related Art

Generally, an ultrasonic motor, for example, a traveling wave type hollowed ultrasonic motor, includes a vibrating element to generate a vibration, and a contacting element to rotate due to a friction force generated on a contacting surface thereof being in press contact with the vibrating element when the vibrating element vibrates. To generate the vibration, the vibrating element is provided with an electric field-converting element layer, which generates minute deformations or displacements due to a piezoelectric effect when it is applied with a voltage having a high frequency that is inaudible to the human ear, for example. The vibrating element is fixedly disposed, and acts as a stator. The contacting element is disposed opposite to the vibrating element to rotate while being in friction contact with the vibrating element according to the vibration of the vibrating element caused by the electric field-converting element layer. The contacting element is disposed to be rotatable and acts as a rotor.

However, since such a conventional traveling wave type hollowed ultrasonic motor is configured so that the vibrating element is fixed and the contacting element is rotated, there is a need to have a fixing part for fixing the vibrating element and a compressing part for supporting the contacting element to be rotatable while being in friction contact with the vibrating element. In addition, if the contacting element is made up of a pair of contacting elements disposed opposite to upper and lower surfaces of the vibrating element to improve torque, the hollowed ultrasonic motor needs a connecting part for connecting the two contacting elements as a body to connect the two contacting elements without a loss in rotation torque. Accordingly, the hollowed ultrasonic motor comes complicated.

Also, since the conventional traveling wave type hollowed ultrasonic motor is configured so that the vibrating element is fixed by the fixing part and the contacting element is rotated by the vibration of the vibrating element generated according to the minute deformations of the electric field-converting element layer, the vibration of the vibrating element generating the rotation torque may be decreased in the process of being transmitted to the contacting element, thereby resulting in a reduction in torque efficiency.

Accordingly, it is required to develop a new ultrasonic motor capable of obtaining high torque efficiency while having a simplified structure.

SUMMARY

Exemplary embodiments of the present invention address at least the above aspects. Accordingly, an aspect of the present invention is to provide an ultrasonic motor capable of obtaining high torque efficiency while having a simplified structure, and a conveying apparatus having the same.

Additional aspects of the invention will be set forth in part in the description which follows and, in part, will be obvious from the description, or may be learned by practice of the invention.

According to one aspect of an exemplary embodiment of the present invention, there is provided an ultrasonic motor including a fixed member including a surface, a movable member positioned to face the surface of the fixed member, and an actuator to cause at least a portion of the movable member to contact the surface of the fixed member and cause the movable member to move relative to the fixed member.

Here, the movable member may include a plurality of projections facing the surface of the fixed member and the actuator may cause one or more of the projections to contact the surface of the fixed member and cause the movable member to move relative to the fixed member.

The projections may be formed on opposite sides of the movable member. In this case, the fixed member may be a first fixed member and the surface of the fixed member is a first surface, and the motor may further include a second fixed member including a second surface. At this time, the movable member may be positioned between the first and second fixed members such that the projections formed on the opposite sides of the movable member face the first and second surfaces. In addition, the actuator may cause one or more of the projections of the movable member to contact the first and second surfaces and cause the movable member to move relative to the first and second fixed members.

The movable member and the fixed member may be circular in shape. Alternatively, at least a portion of the movable member and at least a portion of the fixed member may be linear in shape.

In an embodiment, the actuator may include an electric field-converting element layer attached on the movable member, to produce a traveling wave when the electric field-converting element layer is supplied with an electric power, the movable member may include at least one vibrating element disposed to be movable, the at least one vibrating element being deformable by the traveling wave, and the fixed member may include at least one contact element fixedly disposed opposite to the at least one vibrating element to come in friction contact with the at least one vibrating element when the at least one vibrating element is deformed by the traveling wave.

Here, the at least one vibrating element may include a hollowed plate having the electric field-converting element layer attached thereon, and a projection part disposed on the hollowed plate and having a plurality of projections formed opposite to the contact element in a spaced-apart relation to one another.

At this time, the at least one vibrating element may be disposed to be rotatable or linearly movable.

If the at least one vibrating element is disposed to be rotatable, the hollowed plate may be formed in a circular shape, and if to be linearly movable, in an ellipse shape. In addition, if the hollowed plate may be formed in an ellipse shape having linear portions, the projection part may be disposed on at least one of the linear portions of the hollowed plate, so that it comes in friction contact with the contact element and thus linearly moves the hollowed plate when the hollowed plate is deformed by the traveling wave.

The electric field-converting element layer may be at least one piezoelectric element layer attached on at least one of a first surface and a second surface of the hollowed plate, and the projection part may be a ring disposed on one of an inner circumferential surface and an outer circumferential surface of the hollowed plate, the ring having a plurality of projections formed on at least one of a first surface and a second surface thereof. At this time, the piezoelectric element layer may be formed of one selected from a group consisting of a PZT (lead zirconate titanate), $BaTiO_3$, $PbTiO_3$, $Pb[Zr_xTi_{1-x}]O_3$, $KNbO_3$, $LiNbO_3$, $LiTaO_3$, $Na_xWO_3$, $Ba_2NaNb_5O_5$, $Pb_2KNb_5O_{15}$, a polymer such as a PVDF (polyvinyldene fluoride), and lead-free piezoceramics such as a KNN (sodium potassium noibate) and $BiFeO_3$.

If the at least one piezoelectric element layer include first and second piezoelectric element layers attached on the first surface and the second surface of the hollowed plate, respectively, the first and second piezoelectric element layers may be disposed so that polarized pole arrangements thereof coincide, and may be supplied with alternating voltages, which coincide in frequency and size and between which there is no time-phase difference. In this case, each of the first and the second piezoelectric element layers may be divided into a first phase A and a second phase B, each of which positive and negative poles are alternately polarized. The first phase A and the second phase B may be disposed so that respective opposite ends thereof have gaps of $\lambda/4$ (here, $\lambda$ is a length of one wavelength of the traveling wave in a circumferential direction) and $3\lambda/4$ therebetween.

Alternatively, the first and second piezoelectric element layers may be disposed so that polarized pole arrangements thereof have a spatial phase difference of $\lambda/4$ from each other, and may be supplied with alternating voltages, which coincide in frequency and size and between which there is a time-phase difference of 90 degrees. In this case, each of the first and the second piezoelectric element layers may have a pole arrangement in which 2n polarized surfaces (here, n is the number of wavelengths of the traveling wave produced in a circumferential direction) are alternately polarized as positive and negative poles.

If the plurality of projections includes a plurality of first projections and a plurality of second projections formed on the first and the second surfaces of the ring, respectively, the plurality of first and second projections may have the same size, the same number and the same arrangement.

The contact element may be fixed through a vibration absorbing body. The vibration absorbing body may include at least one of a vibration absorbing material and an elastic spring.

In the embodiment, the at least one vibrating element may include one vibrating element, and the at least one contact element may include two contact elements disposed opposite to a first surface and a second surface of the one vibrating element, respectively. Alternatively, the at least one vibrating element may include one vibrating element, and the at least one contact element may include one contact element disposed opposite to one of a first surface and a second surface of the one vibrating element. In addition, the at least one vibrating element may include two vibrating elements, and the at least one contact element may include three contact elements disposed interposing the two vibrating elements therebetween. In this case, the two vibrating elements may be fixed on individual output shafts.

According to another aspect of an exemplary embodiment of the present invention, there is provided a conveying apparatus, including: an ultrasonic motor including a fixed member including a surface, a movable member rotatably positioned to face the surface of the fixed member, and an actuator to cause at least a portion of the movable member to contact the surface of the fixed member and cause the movable member to move relative to the fixed member; and a motion converting unit connected with the ultrasonic motor, to convert a rotation motion of the movable member into a linear motion and transmit the converted linear motion to a subject to be conveyed.

Here, the actuator may include an electric field-converting element layer attached on the movable member, to produce a traveling wave when the electric field-converting element layer is supplied with an electric power, the movable member may include at least one vibrating element disposed to be movable, the at least one vibrating element being deformable by the traveling wave, and the fixed member may include at least one contact element fixedly disposed opposite to the at least one vibrating element to come in friction contact with the at least one vibrating element when the at least one vibrating element is deformed by the traveling wave.

The motion converting unit may include a cam barrel coupled with the at least one vibrating element to rotate along with the at least one vibrating element and having a linear motion-guide slot, and a guide projection connected to the subject to be conveyed and inserted in the linear motion-guide slot.

The subject to be conveyed may include a focus lens disposed in a lens adaptor of a camera.

Another exemplary embodiment of the invention includes an ultrasonic motor including: a fixed member including a surface; and a movable member disposed to face the surface of the fixed member, the movable member including an actuator to cause at least a portion of the movable member to contact the surface of the fixed member and cause the movable member to move relative to the fixed member.

In yet another exemplary embodiment of the invention, there is a conveying apparatus including: an ultrasonic motor including a fixed member including a surface, a movable member rotatably positioned to face the surface of the fixed member, and an actuator to cause at least a portion of the movable member to contact the surface of the fixed member and cause the movable member to move relative to the fixed member; and a motion converting unit connected with the ultrasonic motor, which converts a rotational motion of the movable member into a linear motion and transmits the linear motion to convey a device.

In another exemplary embodiment of the invention, there is an ultrasonic motor including: a first stator; a second stator, the first and the second stators being substantially fixed; a vibrating rotor disposed between the first and the second stators, the vibrating rotor including: a plurality of projection members disposed at an outer edge of the vibrating rotor and opposingly disposed toward the first and the second stators; a piezoelectric layer disposed between the plurality of projection members and a center of the vibrating rotor; and an output shaft coupled to the vibrating rotor.

Other aspects and salient features of the invention will become apparent to those skilled in the art from the following detailed description, which, taken in conjunction with the annexed drawings, discloses exemplary embodiment of the invention.

BRIEF DESCRIPTION OF THE DRAWINGS

The above aspects and features of the present invention will be more apparent from the description for exemplary embodiments of the present invention taken with reference to the accompanying drawings, in which.

Throughout the drawings, the same drawing reference numerals will be understood to refer to the same elements, features, and structures.

DETAILED DESCRIPTION

Figure 1:
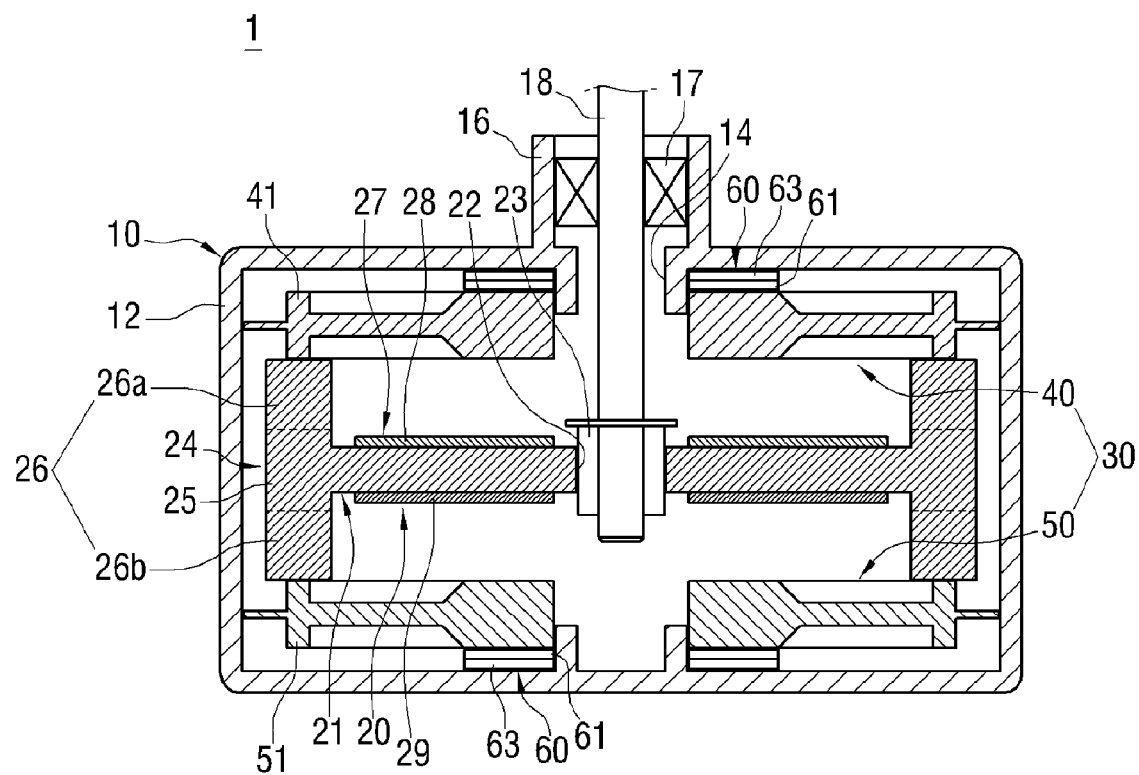
FIG. 1 is a cross-sectional view exemplifying an ultrasonic motor in accordance with an exemplary embodiment of the present invention.

Reference will now be made in detail to exemplary embodiments of the present invention, which are illustrated in the accompanying drawings, wherein like reference numerals refer to the like elements throughout. The exemplary embodiments are described below in order to explain the present invention by referring to the figures. Further, the phrase "at least one of," or "one of," when preceding a list of elements, modifies the entire list of elements and does not modify each element of the list.

FIG. 1 is a cross-sectional view schematically exemplifying an ultrasonic motor 1 in accordance with an exemplary embodiment of the present invention.

Figure 2:
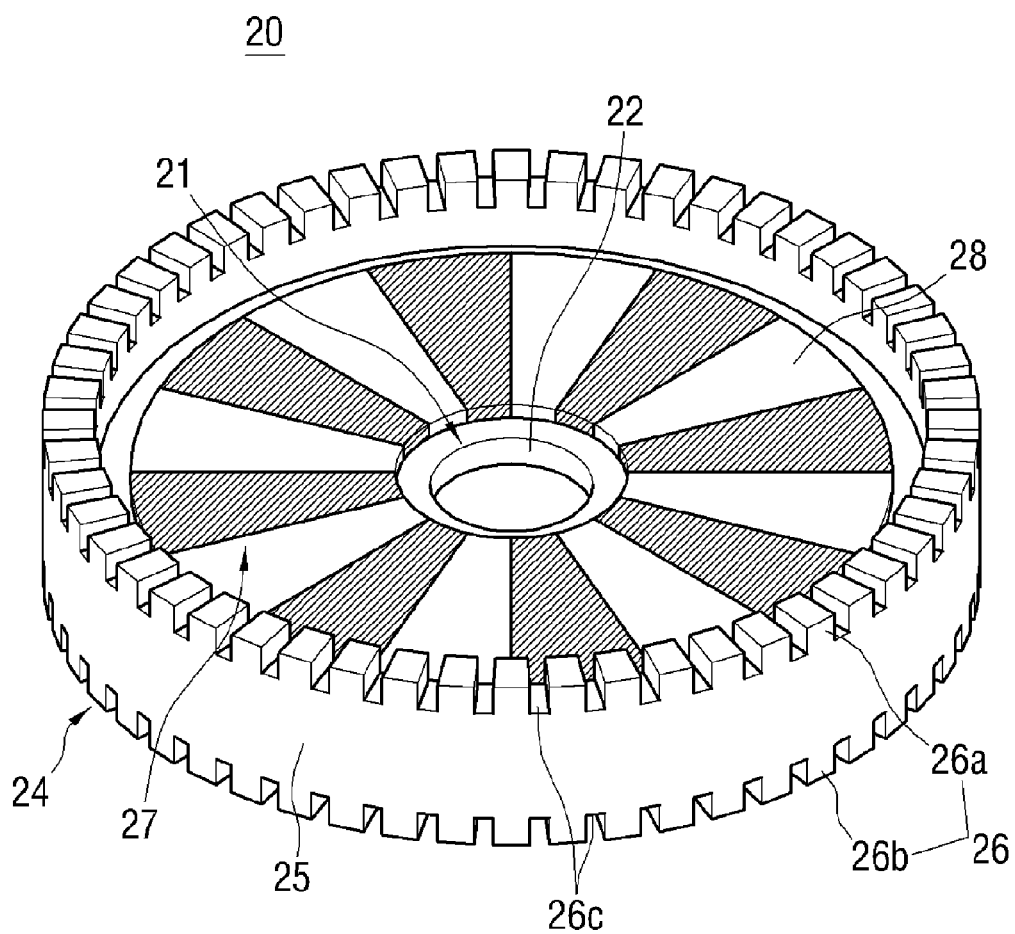
FIG. 2 is a perspective view exemplifying a vibrating element of the ultrasonic motor exemplified in FIG. 1.

As shown in FIG. 1, the ultrasonic motor 1 in accordance with the exemplary embodiment of the present invention, as a traveling wave type hollowed ultrasonic motor, includes a housing 10, a vibrating element 20 (see also FIG. 2), and a contact element 30.

The housing 10 may be a cylindrical casing 12. An opening 14 is formed in the middle of an upper part of the cylindrical casing 12, and a shaft support boss 16 is formed on an upper surface of the cylindrical casing 12 around the opening 14. An output shaft 18 in the cylindrical casing 12 extends out through the opening 14 and supported by a support bearing 17 in the shaft supporting boss 16.

The vibrating element 20 acts as a movable member or a rotor in accordance with the exemplary embodiment of the present invention. When alternating voltages with a high frequency greater than audio frequency, for example, are applied to first and second piezoelectric element layers 28 and 29 of an electric field-converting layer 27, which acts as an actuator as described below, the vibrating element 20 generates a vibration while being minutely displaced or deformed, so that the vibrating element 20 rotates while being in friction contact with the contact element 30. In an exemplary embodiment, the vibrating element 20 is minutely displaced or deformed in an elliptical motion. For this, the vibrating element 20 is provided with a hollowed circular plate 21 and a projection part 24.

To rotate along with the output shaft 18 connected with a subject (not shown) to which a rotating force thereof is transmitted, the hollowed circular plate 21 has a central hole 22 accommodating a fixing sleeve 23 to be fixed thereto. The fixing sleeve 23 is fixed by a key (not shown) on a lower part of the output shaft 18. The hollowed circular plate 21 may be formed of a stainless steel material or a bronze material.

To generate vibration when the alternating voltage with high frequency is applied, the hollowed circular plate 21 has an electric field-converting element layer 27 to produce a traveling wave when it is supplied with the alternating voltage with high frequency. To double the torque efficiency of the ultrasonic motor 1, the electric field-converting element layer 27 may be made up of first and second piezoelectric element layers 28 and 29 attached on an upper surface and a lower surface of the hollowed circular plate 21, respectively. Each of the first and second piezoelectric element layers 28 and 29 may be formed of a hollowed disc in which positive and negative poles are alternately polarized, so that when it is supplied with the alternating voltage, it is minutely displaced or deformed due to the piezoelectric effect to generate vibration. The positive and the negative poles may correspond to the shaded and the unshaded portions, or vice versa, as shown in the piezoelectric element layer 28 depicted in FIG. 2. The hollowed disc may be formed of one selected from a group consisting of a PZT (lead zirconate titanate), $BaTiO_3$, $PbTiO_3$, $Pb[Zr_xTi_{1-x}]O_3$, $KNbO_3$, $LiNbO_3$, $LiTaO_3$, $Na_xWO_3$, $Ba_2NaNb_5O_5$, $Pb_2KNb_5O_{15}$, a polymer such as a PVDF (polyvinyldene fluoride), and lead-free piezoceramics such as a KNN (sodium potassium noibate) and $BiFeO_3$. In addition, the hollowed disc may have a thickness of 0.1 through 1 mm, preferably, but not necessarily, about 0.3 mm.

The first and second piezoelectric element layers 28 and 29 constructed as described above may be disposed, so that polarized pole arrangements thereof coincide or have a certain spatial phase difference to each other.

Figure 3A:
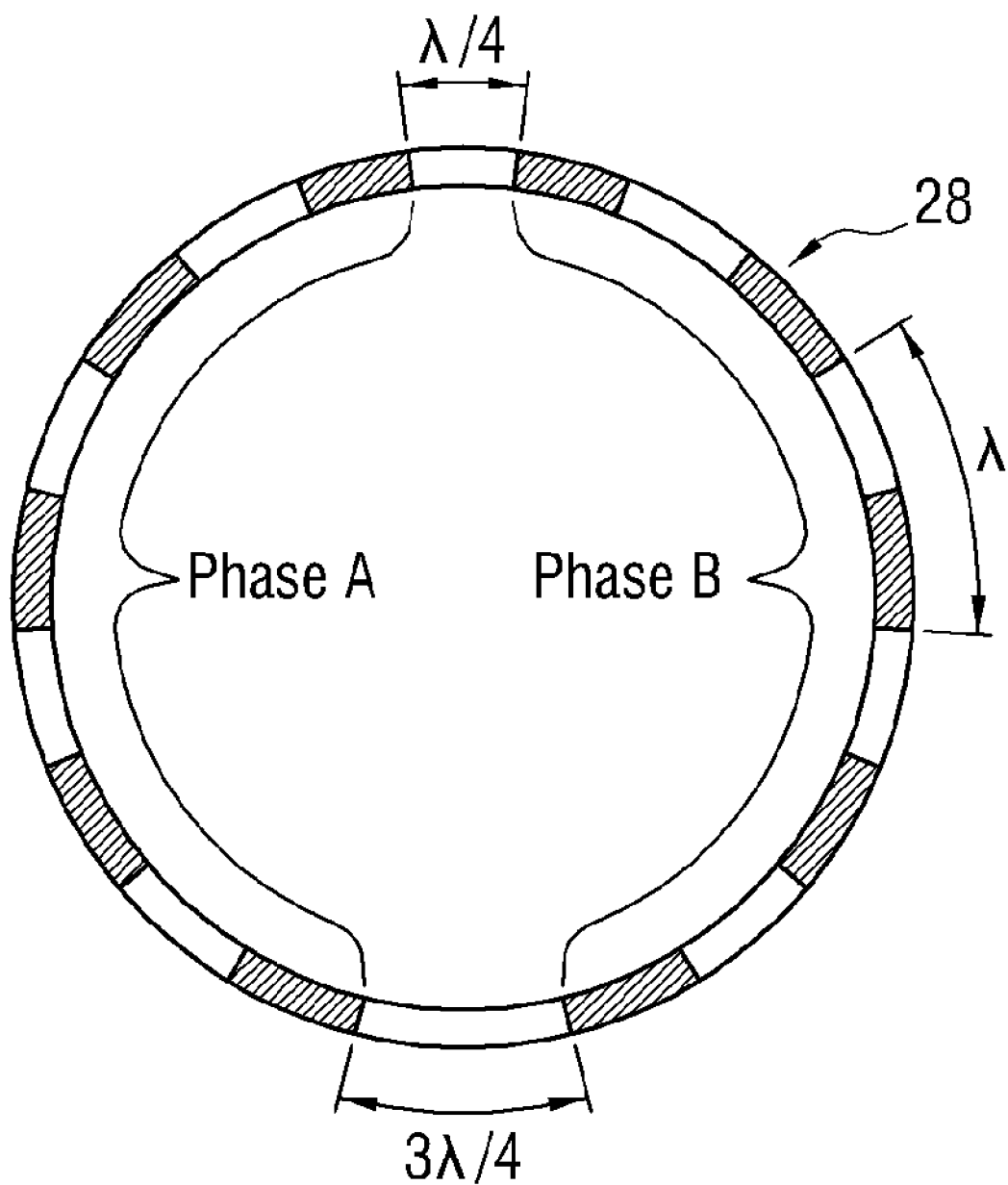
FIGS. 3A and 3B are top plan views exemplifying an example of polarized pole arrangements of first and second piezoelectric element layers of an electric field-converting element layer of the vibrating element of the ultrasonic motor exemplified in FIG. 1.
Figure 3B:
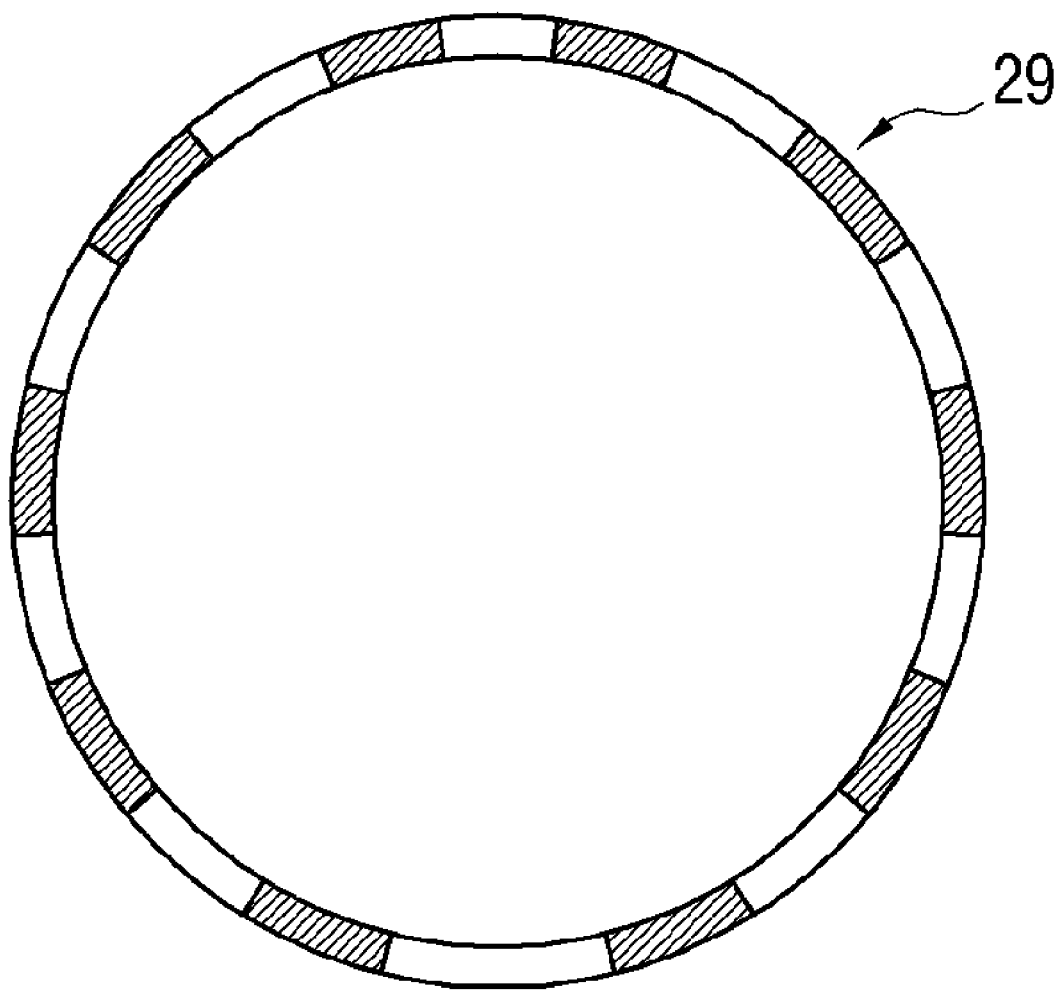

As shown in FIGS. 3A and 3B, if the first and second piezoelectric element layers 28 and 29 are disposed to have coinciding polarized pole arrangements, each of the first and the second piezoelectric element layers 28 and 29 is divided into a first phase A and a second phase B, each having a polarized pole arrangement of which positive and negative poles are alternately polarized. In an exemplary embodiment, the positive poles of the first piezoelectric element layer 28 are disposed directly over the positive poles of the second piezoelectric element layer 29. The first phase A and the second phase B are supplied with alternating voltages of sine and cosine forms, which coincide in size and frequency, through corresponding electrodes (not shown) formed on the first phase A and the second phase B, so that they generate sine waves, respectively. To form one traveling wave from the two sine waves, the two sine waves should have a spatial phase difference of $\lambda/4$ (here, $\lambda$ is a length of one wavelength of the traveling wave produced in a circumferential direction) to each other. Thus, the first phase A and the second phase B are disposed so that respective opposite ends thereof have gaps of $\lambda/4$ and $3\lambda/4$ therebetween. The gaps between the first phase A and the second phase B are not supplied with the alternating voltages, but connected to a sensing unit (not shown) or grounded.

The first and the second piezoelectric element layers 28 and 29 constructed as described above are attached on the upper surface and the lower surface of the hollowed circular plate 21, respectively, so that the polarized pole arrangements thereof coincide. The same phases A or B of the first and the second piezoelectric element layers 28 and 29 are supplied with alternating voltages, which coincide in frequency and size and between which there is no time-phase difference. Accordingly, one traveling wave is produced on the first and the second piezoelectric element layers 28 and 29 and thus the first and the second piezoelectric element layers 28 and 29 generate minute displacements and deformations in the form of the traveling wave (i.e., a ripple).

Figure 4A:
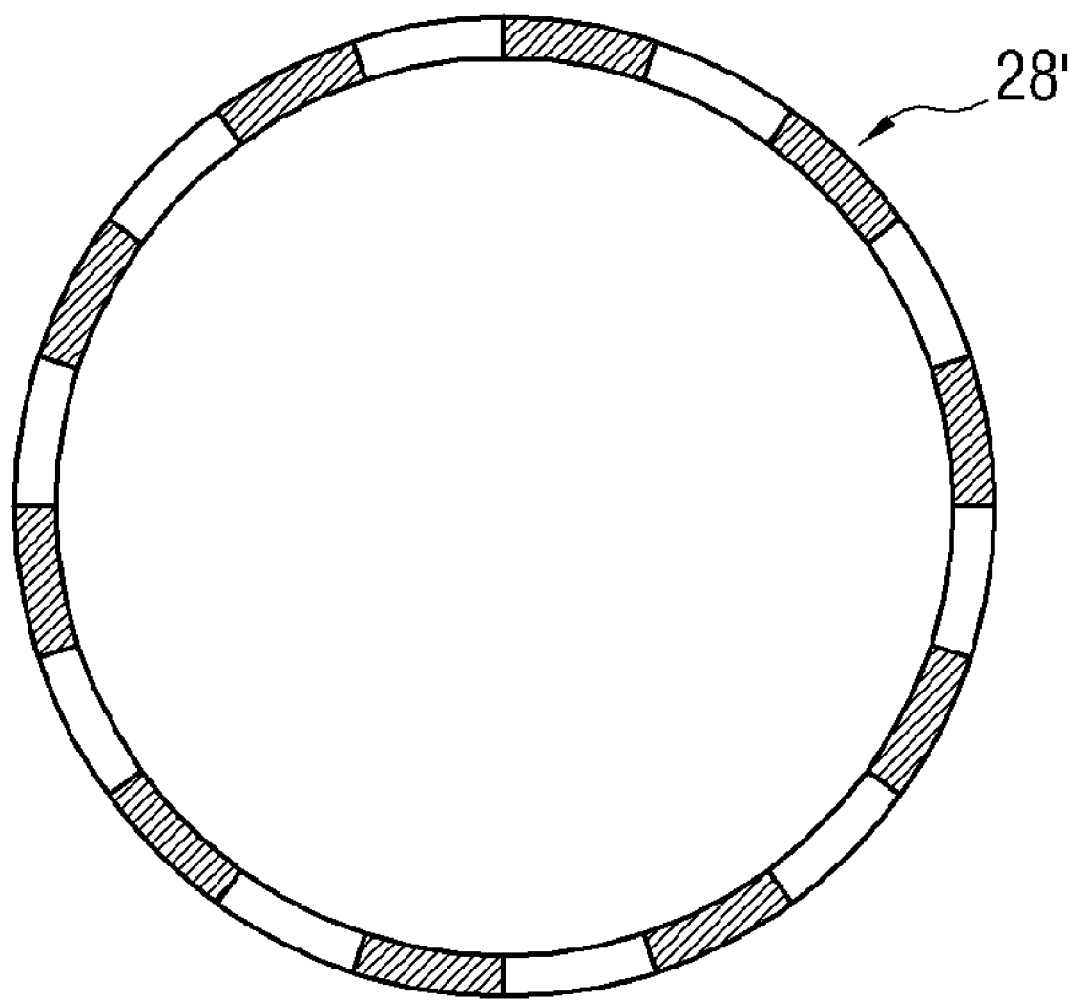
FIGS. 4A and 4B are top plan views exemplifying another example of the polarized pole arrangements of the first and the second piezoelectric element layers of an electric field-converting element layer of the vibrating element of the ultrasonic motor exemplified in FIG. 1.
Figure 4B:
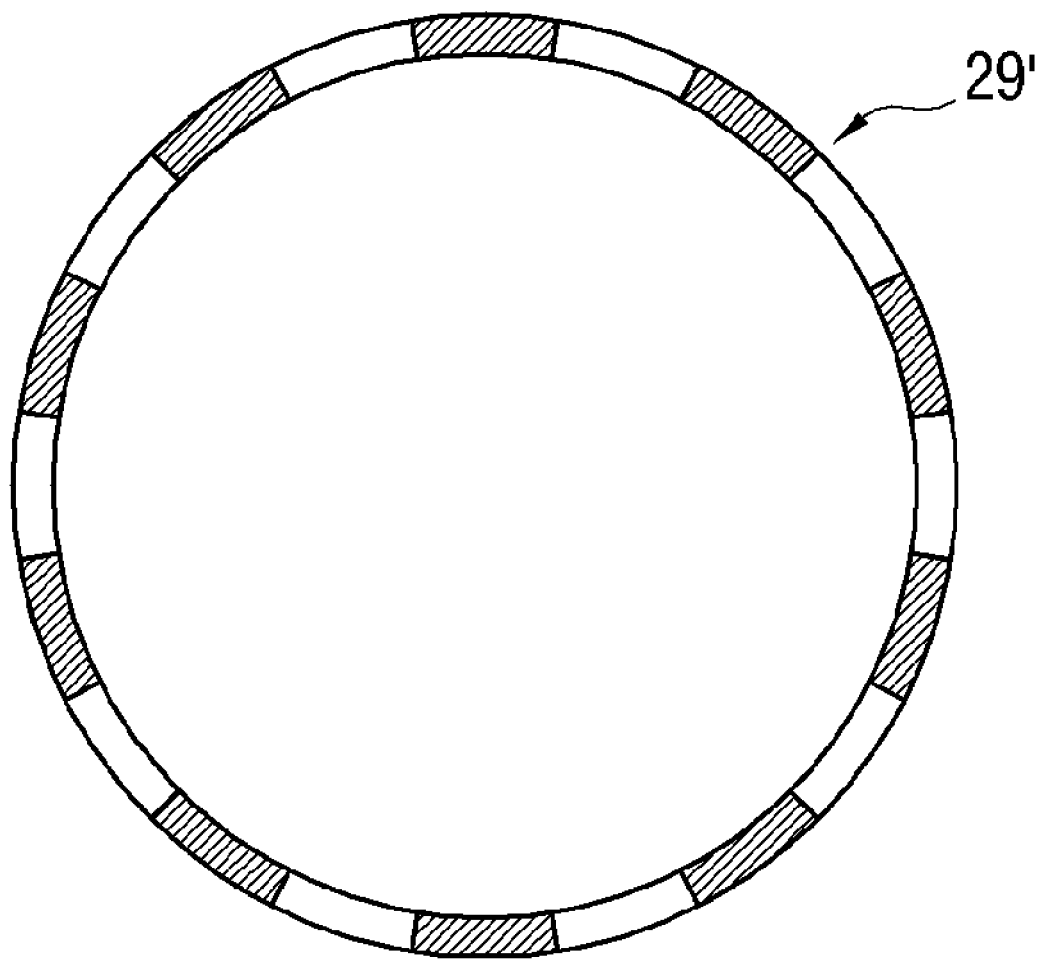

As shown in FIGS. 4A and 4B, if the first and second piezoelectric element layers 28' and 29' are disposed so that the polarized pole arrangements thereof have the certain spatial phase difference, each of the first and the second piezoelectric element layers 28' and 29' is formed to have an polarized pole arrangement in which 2n polarized surface (here, n is the number of wavelengths of the traveling wave produced in the circumferential direction) are alternately polarized as positive and negative poles.

The first and the second piezoelectric element layers 28' and 29' constructed as described above are attached on the upper surface and the lower surface of the hollowed circular plate 21, respectively, so that the polarized pole arrangements thereof have a spatial phase difference of $\lambda/4$ from each other. The first and the second piezoelectric element layers 28' and 29' are supplied with alternating voltages, which coincide in frequency and size and between which there is a time-phase difference of 90 degrees, through corresponding electrodes (not shown) formed thereon. Accordingly, one traveling wave is produced on the first and the second piezoelectric element layers 28' and 29' and thus the first and the second piezoelectric element layers 28' and 29' generate minute displacements and deformations in the in the form of the traveling wave (i.e., a ripple).

To supply the alternating voltages to the first and the second piezoelectric element layers 28 and 29, or 28' and 29', a flexible printed circuit board FPCB (not shown) is connected to the electrodes of the first and the second piezoelectric element layers 28 and 29, or 28' and 29', and thus the alternating voltages are supplied to the first and the second piezoelectric element layers 28 and 29, or 28' and 29' from an outer power supply. The FPCB does not disturb a motion of the hollowed circular plate 21 or generate a twist when the hollowed circular plate 21 is rotated in a certain rotation angle, for example, an angle of about ±140 degrees, which is required when the ultrasonic motor is mounted on an interchangeable lens of a single lens reflex camera. If the hollowed circular plate 21 should continue to rotate or an amount of rotation of the hollowed circular plate 21 exceeds a permissible range of the FPCB, a power supply having a printed circuit board (PCB) may be used. The PCB includes a circular contact either i) disposed in a vicinity of an inner circumferential surface of the hollowed circular plate 21 (when the first and the second piezoelectric element layers 28 and 29 are employed) or ii) attached on exposed surfaces of the first and the second piezoelectric element layers 28' and 29' and not attached to the hollowed circular plate 21 (when the first and the second piezoelectric element layers 28' and 29' are employed). A brush is disposed to come in contact with the circular contact of the PCB may be used to continue to supply the alternating voltages to the first and the second piezoelectric element layers 28 and 29, or 28' and 29' from the outer power supply.

A projection part 24 increases an amplitude of elliptical motion which is generated on the surface of the vibrating element 20. The projection part 24 is in friction contact with the contact element 30 when the hollowed circular plate 21 is vibrated by the minute displacements or deformations of the first and the second piezoelectric element layers 28 and 29, or 28' and 29', and thus generates a rotating force to rotate the hollowed circular plate 21. For this, the projection part 24 is made up of a circular ring 25 disposed on the hollowed circular plate 21 to face the contact element 30. The circular ring 25 has a plurality of projections 26. The circular ring 25 may be disposed on an inner circumferential surface of an outer circumferential surface of the hollowed circular plate 21. In an exemplary embodiment of the present invention, the circular ring 25 is illustrated as disposed on the outer circumferential surface of the hollowed circular plate 21.

The plurality of projections 26 is made up of a plurality of first projections 26a and a plurality of second projections 26b formed on an upper surface and a lower surface of the circular ring 25, respectively. The plurality of first and second projections 26a and 26b may be formed by forming slits 26c in the upper surface and the lower surface of the circular ring 25, spaced apart from one another and serve to amplify the motion of the circular ring 25.

The plurality of first and second projections 26a and 26b may be formed to have the same size, the same number and the same arrangement. However, the present invention is not limited thereto, and the plurality of first and second projections 26a and 26b may be formed to have different sizes, different numbers and different arrangements.

The contact element 30 acts as a fixed member or a stator, and as mentioned above, assists to allow the projection part 24 to generate the rotating force for rotating the hollowed circular plate 21 by being in friction contact with the projection part 24 when the hollowed circular plate 21 vibrates while generating the minute displacements or deformations in the form of the traveling wave by the first and the second piezoelectric element layers 28 and 29, or 28' and 29'. For this, the contact element 30 is fixedly disposed opposite to the vibrating element 20 in the housing 10, so that it is not rotated.

The contact element 30 is made up of first and second contact elements 40 and 50. Each of the first and the second contact elements 40 and 50 is formed of a hollowed disc having a shape corresponding to the hollowed circular plate 21 of the vibrating element 20. The first and the second contact elements 40 and 50 are provided with first and second contact rings 41 and 51 disposed at circumferential edges thereof to come in contact with the first and the second projections 26a and 26b, respectively.

To prevent the vibration generated from the vibrating element 20 from being transmitted to the housing 10, the first and the second contact elements 40 and 50 are fixedly disposed on an inner upper surface and an inner bottom surface of the housing 10 through a vibration absorbing body 60, respectively. The vibration absorbing body 60 may be made up of a vibration absorbing material 61 and an elastic spring 63. Although in the exemplary embodiment of the present invention, the vibration absorbing body 60 is illustrated and explained as made up of both the vibration absorbing material 61 and the elastic spring 63, the vibration absorbing body 60 can be made up of only one of the vibration absorbing material 61 and the elastic spring 63. In an exemplary embodiment, the vibration absorbing body 60 also has a function of urging the first and the second contact elements 40 and 50 toward the vibrating element 20 in a press contact to ensure consistent contact therebetween.

Since the first and the second contact elements 40 and 50 are supported and fixed by the vibration absorbing body 60 in the housing 10 as described above, there is no need for the ultrasonic motor 1 to have the connecting unit for connecting the contact elements as in the conventional ultrasonic motor. Accordingly, the ultrasonic motor 1 is simple in construction.

Also, since the first and the second contact elements 40 and 50 are fixed and the vibrating element 20 is rotated, the rotational torque transmission loss between the vibrating element and the contacting element, which reduce torque efficiency as in the conventional ultrasonic motor, is prevented.

In the above description, although the ultrasonic motor 1 according to the exemplary embodiments of the present invention is illustrated and explained as including one vibrating element 20 having the electric field-converting layer 27 attached on the upper and the lower surfaces thereof and two first and second contact elements 40 and 50 disposed opposite to the vibrating element 20, it can be embodied in various different forms. As part of the principles of the invention, the vibrating element 20 is movably disposed and the contact element 30 (40 and 50) is fixedly disposed.

Figure 5:
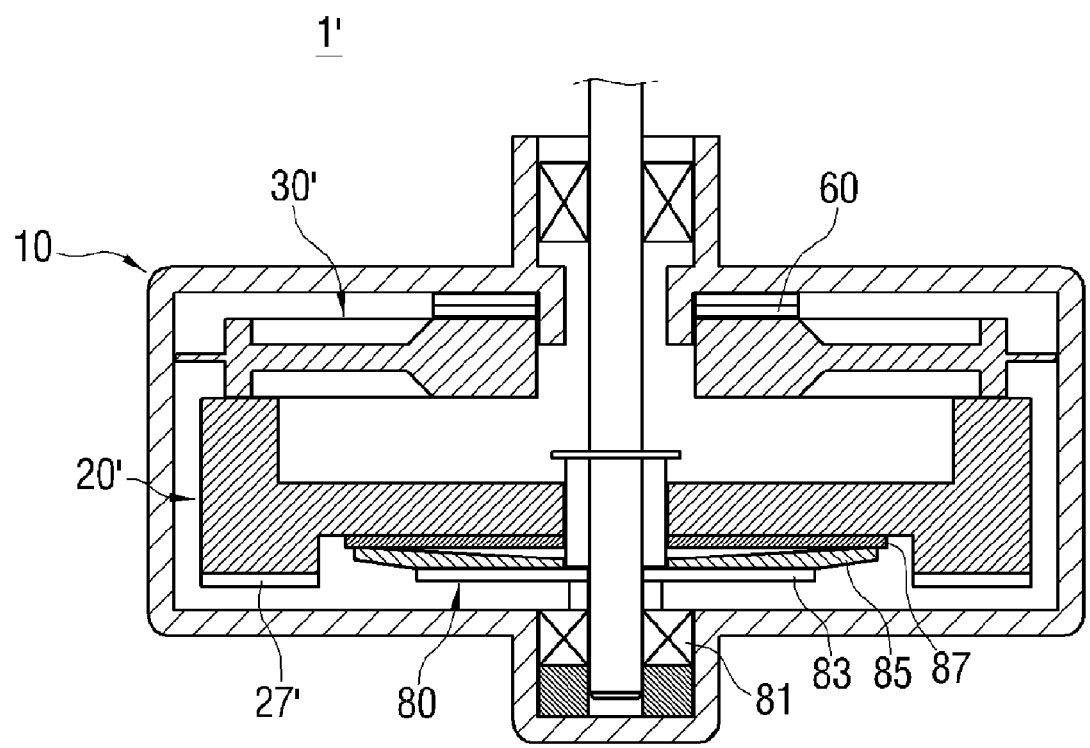
FIG. 5 is a cross-sectional view exemplifying an modified example of the ultrasonic motor in accordance with an exemplary embodiment of the present invention.

For instance, as shown in FIG. 5, an ultrasonic motor 1' according to an modified example of an exemplary embodiment of the present invention is configured to include one vibrating element 20' having an electric field converting layer 27' and one contact element 30' disposed opposite to the vibrating element 20'. In this case, the electric field-converting layer 27' is formed only on a lower surface of the vibrating element 20'. In addition, a press unit 80 is disposed under the vibrating element 20' to bring the vibrating element 20' in press contact with the contact element 30' and thus support the vibrating element 20' to be rotatable while being in friction contact with the contact element 30'. The press unit 80 is provided with a press plate 83, a dish spring 85, and an elastic member 87. The press plate 83 is arranged on a bearing 81 supporting an output shaft. The dish spring 85 is located on the press plate 83, so that it brings the vibrating element 20' in press contact with the contact element 30'. The elastic member 87 evenly distributes a pressure by an elastic force of the dish spring 85 over the vibrating element 20'.

Figure 6:
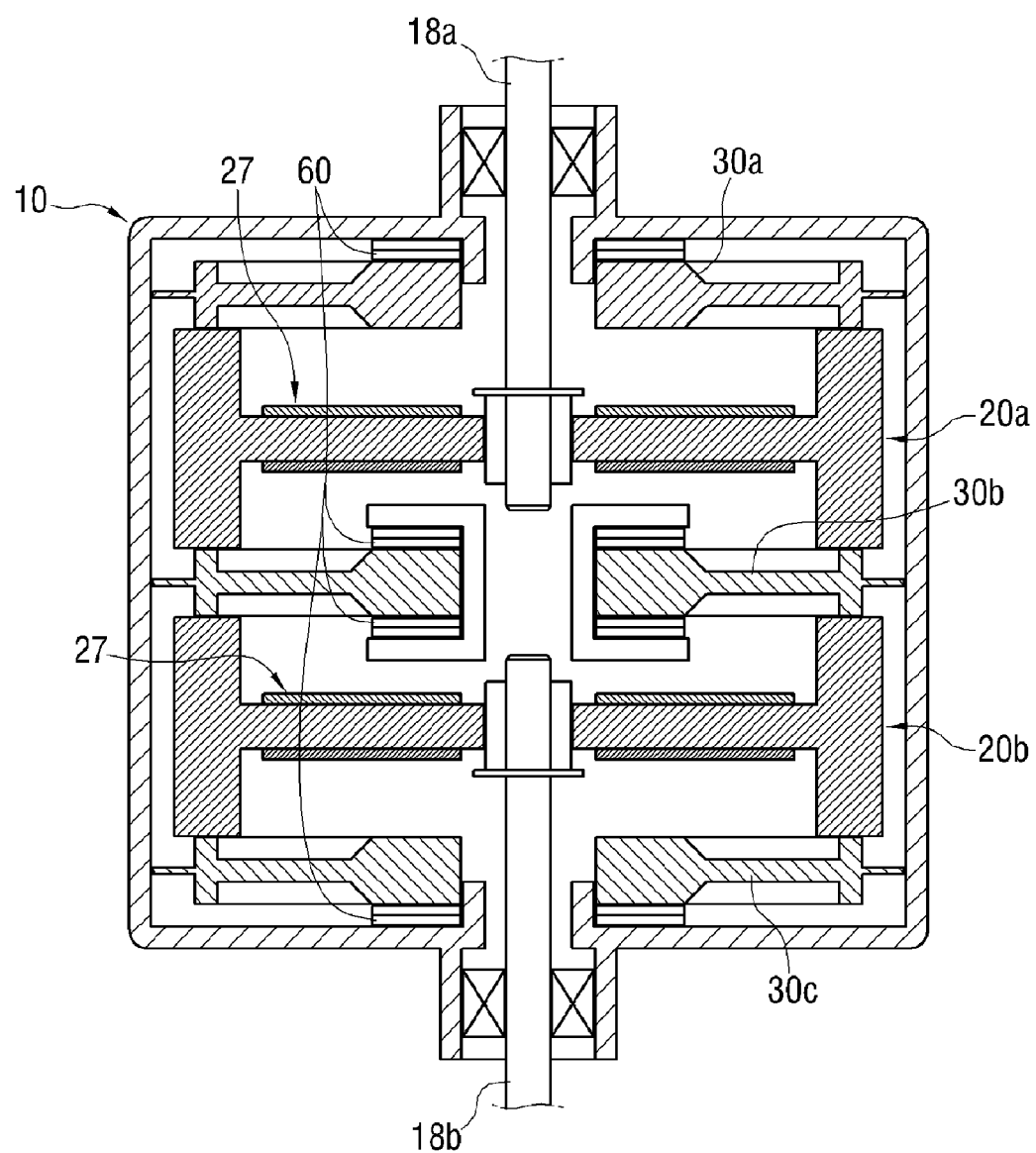
FIG. 6 is a cross-sectional view exemplifying another modified example of the ultrasonic motor in accordance with an exemplary embodiment of the present invention.

Further, as shown in FIG. 6, an ultrasonic motor 1" according to another modified example of an exemplary embodiment of the present invention is configured to include two vibrating elements 20a and 20b having electric field-converting layers 27 attached on upper and lower surfaces thereof, respectively, and three contact elements 30a, 30b and 30c disposed opposite to the electric field converting layer 27 while interposing the two vibrating elements 20a and 20b therebetween. In this case, the two vibrating elements 20a and 20b may be fixed on individual output shafts, that is, first and second output shafts 18a and 18b, so that they transmit rotating forces to corresponding individual subjects (not shown) to which the rotating forces are transmitted.

Also, although the ultrasonic motor 1 according to an exemplary embodiment of the present invention is illustrated and explained as applied to a rotary motor in which the vibrating element 20, 20', or 20a and 20b rotates while being in friction contact with the contact element 30, 30', or 30a, 30b and 30c, it can be applied to other types of motors within the principles of the invention as mentioned above.

Figure 7:
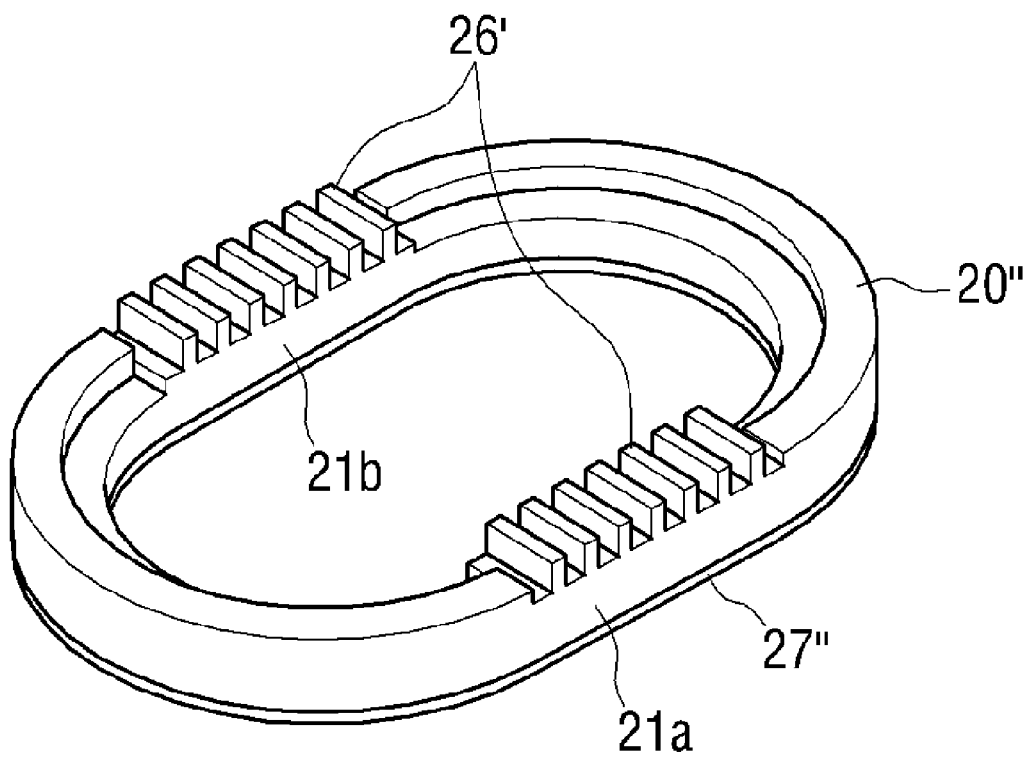
FIG. 7 is a perspective view exemplifying a vibrating element applied to further another modified example of the ultrasonic motor in accordance with an exemplary embodiment of the present invention.
Figure 8A:
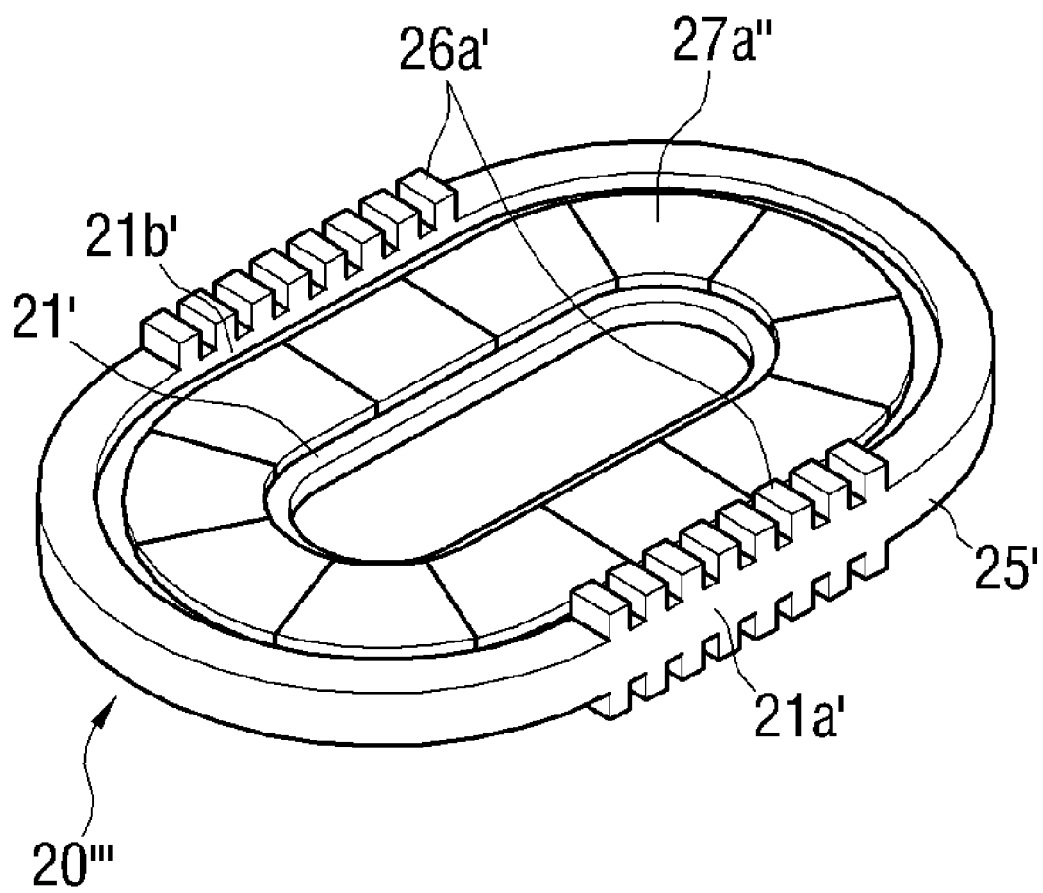
FIGS. 8A and 8B are a perspective view exemplifying a vibrating element applied to also another modified example of the ultrasonic motor in accordance with an exemplary embodiment of the present invention, and a cross-sectional view exemplifying the also another modified example of the ultrasonic motor having the same, respectively.

For instance, as shown in FIGS. 7 and 8A, there is a vibrating element 20" or 20'" configured to include a hollowed elliptic plate. The hollowed elliptic plate may have a projection part 26' formed on upper surfaces of linear portions 21a and 21b thereof and an electric field-converting element layer 27" formed on a lower surface thereof (FIG. 7). Alternatively, there may be a hollowed elliptic plate 21' having the electric field-converting element layer 27a" formed on upper and lower surfaces thereof and an elliptic ring 25' having a projection part 26a' formed on upper and lower surfaces of linear portions 21a' and 21b' thereof (FIG. 8A). There is a contact element is configured to come in contact with at least one of the linear portions 21a and 21b, or 21a' and 21b'. As a result, a linear motor in which the vibrating element 20" or 20'" moves in a straight line while being in contact with the contact element, can be achieved.

Figure 8B:
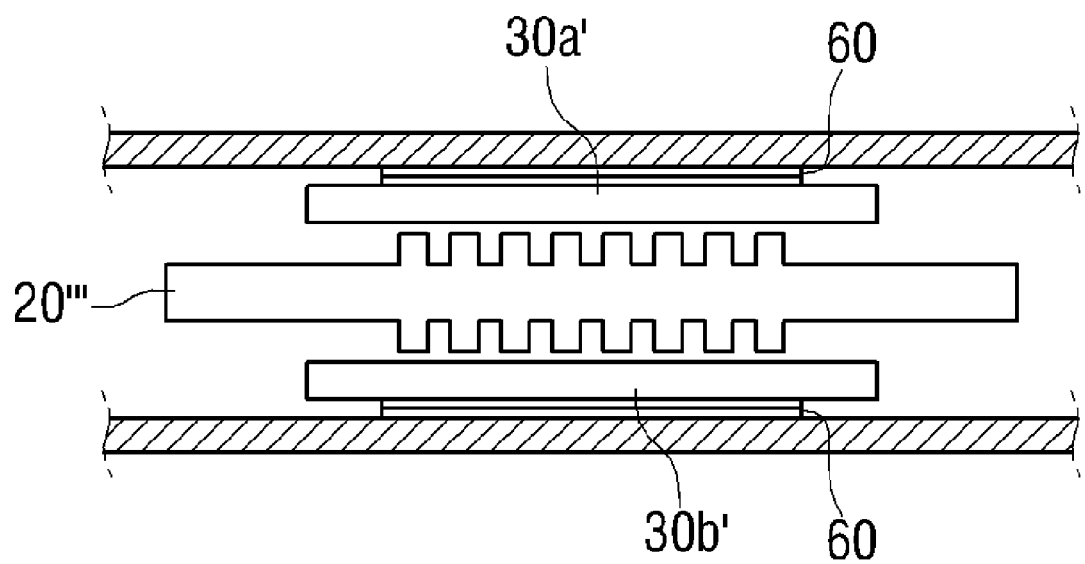

That is, as shown in FIG. 8B, in case that the vibrating element 20'" include the hollowed elliptic plate 21' and the elliptic ring 25', if the vibrating element 20'" is not fixed to be rotatable about a rotating axis, but to be movable in a straight line by a guide part (not shown) and contact elements 30a' and 30b' are fixedly disposed opposite to the projection part 26a' formed on at least one of the linear portions 21a' and 21b', a linear motor in that when the electric field-converting element layer 27a" is supplied with alternating voltage, the vibrating element 20'" is moved in a straight line while being in contact with the contact elements 30a' and 30b' can be embodied.

Hereinafter, an operation of the ultrasonic motor 1 in accordance with an exemplary embodiment of the present invention constructed as described above will be described with reference to FIGS. 4A through 4B.

First, as the first and the second piezoelectric layer 28 and 29, or 28' and 29' of the electric field-converting layer 27 of the vibrating element 20 are respectively applied with alternating voltages between which there is no time-phase difference or between which there is a time-phase difference of 90 degrees, through the electrodes, a traveling wave is produced on the first and the second piezoelectric layer 28 and 29, or 28' and 29'. As a result, the first and the second piezoelectric layer 28 and 29, or 28' and 29' generate minute displacements or deformations in the form of a ripple by the traveling wave. Accordingly, the hollowed circular plate 21 of the vibrating element 20 having the first and the second piezoelectric layer 28 and 29, or 28' and 29'attached the upper and lower surfaces thereof also vibrates while generating displacements or deformations in the form of the traveling wave, that is, the ripple.

As the hollowed circular plate 21 vibrates, the circular ring 25 of the projection part 24 attached on the outer circumferential surface of the hollowed circular plate 21 also vibrates, and thus the plurality of first and second projections 26a and 26b formed on the upper and the lower surface of the circular ring 25 rotate the hollowed circular plate 21 while being in friction contact with the contact element 30 (40 and 50).

As the hollowed circular plate 21 rotates, the output shaft 18 fixing the hollowed circular plate 21 thereon is rotated, and the subject connected to the output shaft 18 to receive a rotating force thereof is rotated.

Figure 9:
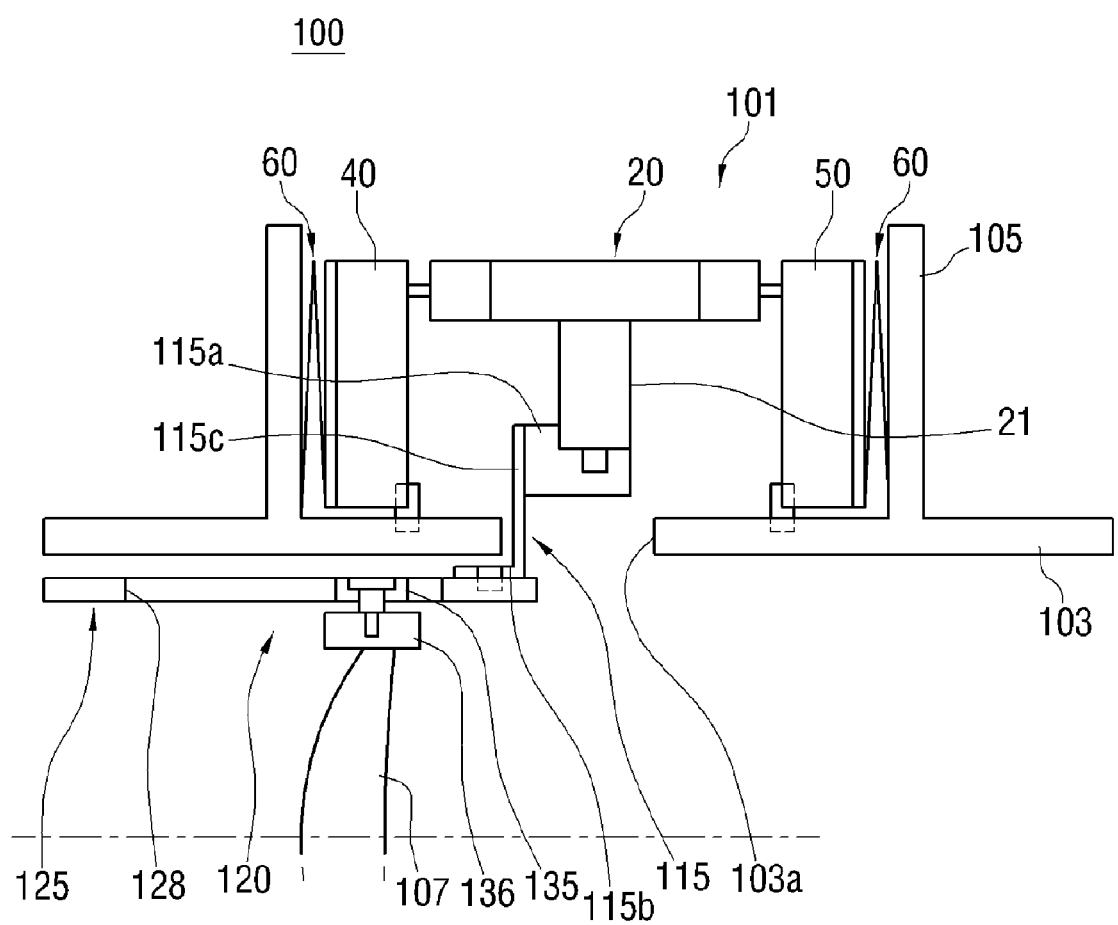
FIG. 9 is a partial cross-sectional view exemplifying a conveying apparatus having the ultrasonic motor in accordance with an exemplary embodiment of the present invention, when it is cut away by half, based on a center line thereof.

FIG. 9 shows half of a cross-sectional view of a conveying apparatus 100 to which the ultrasonic motor 1 in accordance with an exemplary embodiment of the present invention is applied.

The conveying apparatus 100 includes an ultrasonic motor 101 and a motion converting unit 120.

The ultrasonic motor 101 is mounted on a bracket 105 installed on subject to be conveyed, for example, an outer circumferential surface of a lens adapter 103 of a camera. The ultrasonic motor 101 has almost the same constructions as those of the ultrasonic motor 1 in accordance with an exemplary embodiment of the present invention explained with reference to FIGS. 1 through 4B, except that the first and the second contact elements 40 and 50 are fixedly disposed on the bracket 105 by the vibration absorbing body 60 and the hollowed circular plate 21 is not fixed to the output shaft 18, but connected to the motion converting unit 120. Accordingly, a detailed description on constructions of the ultrasonic motor 101 will be omitted.

The motion converting unit 120, as a subject to which a rotating force of the ultrasonic motor 101 is transmitted, is connected to the vibrating element 20 of the ultrasonic motor 1. The motion converting unit 120 converts a rotation motion of the vibrating element 20 into a linear motion and transmits the converted linear motion to a subject to be conveyed, that is, a focus lens 107 disposed to be movable in left and right horizontal directions (of FIG. 9) in the lens adapter 103. For this, the motion converting unit 120 is provided with a cam barrel 125 and a guide projection 135.

The cam barrel 125 is disposed to be rotatable in the lens adapter 103 and coupled with the hollowed circular plate 21 of the vibrating element 20 through a connecting part 115 to rotate along with the vibrating element 20. The connecting part 115 at a first cylinder 115a thereof is coupled to an inner circumferential surface of the hollowed circular plate 21 by screws, and at a second cylinder 115b thereof is coupled to an upper surface of an outer circumferential surface of the cam barrel 125. A connecting disc 115c of the connecting part 115 is disposed penetrating through an opening 103a of the lens adapter 103, and connects between the first cylinder 115a and the second cylinder 115b.

A linear motion-guiding slot 128 is formed on the cam barrel 125 to accommodate a guide projection 135. The linear motion-guiding slot 128 is formed in such a shape that when the cam barrel 125 is rotated by the vibrating element 20, the guide projection 135 accommodated therein can be moved in a straight line, that is, in left and right directions (of FIG. 9). In an exemplary embodiment, the linear motion-guiding slot 128 may be a helical gear (or another element capable of restricting the motion of the guide projection 135 in a linear direction). When the cam barrel rotates, a key and a key groove may be disposed between the cam barrel 125 and the fixing bracket 136 so that the focus lens 107 can have only a horizontal motion without a rotation motion. Alternatively, other conventional techniques to restriction the motion of the guide projection 135 in the straight line, may be utilized.

The guide projection 135 is fixed to a fixing bracket 136 mounted on an outer circumferential surface of the focus lens 107, so that it is inserted into the linear motion-guiding slot 128. When the cam barrel 125 is rotated, the guide projection 135 is moved left and right along the linear motion-guiding slot 128 to move the focus lens 107 left and right (in FIG. 9).

Hereinafter, an operation of the conveying apparatus 100 constructed as described above will be described.

First, to adjust a focus of the focus lens 107, the ultrasonic motor 101 is turned on through an adjusting switch (not shown) of the camera, and operated as described with reference to FIGS. 1 through 4B. As the ultrasonic motor 101 operates, the cam barrel 125 connected with the hollowed circular plate 21 of the vibrating element 20 through the connecting part 115 is rotated along with the hollowed circular plate 21.

When the cam barrel 125 rotates, the guide projection 135 inserted in the linear motion-guiding slot 128 is moved left and right along the linear motion-guiding slot 128, and thus the focus lens 107 fixed to the guide projection 135 is also moved left and right.

After the focus lens 107 is moved to adjust the focus, the ultrasonic motor 101 is turned off through the adjusting switch, and the focus adjusting operation of the focus lens 107 is completed.

Although exemplary embodiments of the present invention has been shown and described, it will be appreciated by those skilled in the art that changes may be made in the embodiment without departing from the principles and spirit of the invention, the scope of which is defined in the claims and their equivalents.

What is claimed is:

1. An ultrasonic motor comprising:
a fixed member including a surface; and
a movable member disposed to face the surface of the fixed member, the movable member comprising an actuator to cause at least a portion of the movable member to contact the surface of the fixed member and cause the entire movable member to rotate as a whole relative to the fixed member.

2. The motor according to claim 1, wherein the movable member comprises a plurality of projections facing the surface of the fixed member and the actuator causes one of the plurality of projections to contact the surface of the fixed member and causes the movable member to rotate relative to the fixed member.

3. The motor according to claim 2, wherein the plurality of projections are formed on opposite sides of the movable member.

4. The motor according to claim 3, wherein the fixed member is a first fixed member and the surface of the first fixed member is a first surface, the motor further comprising a second fixed member including a second surface, and the movable member is positioned between the first and the second fixed members such that the plurality of projections formed on the opposite sides of the movable member face the first and the second surfaces.

5. The motor according to claim 4, wherein the actuator causes the one of the plurality of projections and another of the plurality of projections of the movable member to contact the first and the second surfaces and cause the movable member to rotate relative to the first and the second fixed members.

6. The motor according to claim 1, wherein the movable member is circular in shape.

7. The motor according to claim 1, wherein the fixed member is circular in shape.

8. The motor according to claim 1, wherein at least a portion of the movable member is linear in shape.

9. The motor according to claim 1, wherein at least a portion of the fixed member is linear in shape.

10. The motor according to claim 1,
wherein the actuator comprises an electric field-converting element layer disposed on the movable member, which shapes the movable member into a traveling wave shape if the electric field-converting element layer is supplied with an electric power,
wherein the movable member comprises at least one vibrating element that is movable, the at least one vibrating element being deformable to generate the traveling wave shape, and
wherein the fixed member comprises at least one contact element fixedly disposed opposite to the at least one vibrating element to come in friction contact with the at least one vibrating element when the at least one vibrating element is deformed into the traveling wave shape.

11. The motor according to claim 10, wherein the contact element is substantially fixed through a vibration absorbing body.

12. The motor according to claim 11, wherein the vibration absorbing body comprises at least one of a vibration absorbing material and an elastic spring.

13. The motor according to claim 10,
wherein the at least one vibrating element comprises one vibrating element, and
wherein the at least one contact element comprises two contact elements disposed opposite to a first surface and a second surface of the one vibrating element.

14. The motor according to claim 10,
wherein the at least one vibrating element comprises one vibrating element, and
wherein the at least one contact element comprises one contact element disposed opposite to one of a first surface and a second surface of the one vibrating element.

15. The motor according to claim 10,
wherein the at least one vibrating element comprises two vibrating elements, and
wherein the at least one contact element comprises three contact elements interposingly disposed about the two vibrating elements.

16. The motor according to claim 15, wherein the two vibrating elements are fixed on respective output shafts.

17. An ultrasonic motor comprising:
a fixed member including a surface; and
a movable member disposed to face the surface of the fixed member, the movable member comprising an actuator to cause at least a portion of the movable member to contact the surface of the fixed member and cause the movable member to move relative to the fixed member;
wherein the actuator comprises an electric field-converting element layer disposed on the movable member, which shapes the movable member into a traveling wave shape if the electric field-converting element layer is supplied with an electric power,
wherein the movable member comprises at least one vibrating element that is movable, the at least one vibrating element being deformable to generate the traveling wave shape,
wherein the fixed member comprises at least one contact element fixedly disposed opposite to the at least one vibrating element to come in friction contact with the at least one vibrating element when the at least one vibrating element is deformed into the traveling wave shape, and
wherein the at least one vibrating element comprises:
a hollowed plate comprising the electric field-converting element layer attached thereon; and
a projection part disposed on the hollowed plate, the projection part comprising a plurality of projections formed opposite to the contact element.

18. The motor according to claim 17, wherein the at least one vibrating element is movable in one of a rotary motion and a linear motion.

19. The motor according to claim 17, wherein the hollowed plate is formed in one of a circular shape and an ellipse shape.

20. The motor according to claim 19,
wherein the hollowed plate is formed in an ellipse shape comprising linear portions, and
wherein the projection part is disposed on at least one of the linear portions of the hollowed plate.

21. The motor according to claim 17, wherein the electric field-converting element layer comprises at least one piezoelectric element layer attached on at least one of a first surface and a second surface of the hollowed plate.

22. The motor according to claim 21, wherein the piezoelectric element layer is formed of one selected from a group consisting of a lead zirconate titanate (PZT), $BaTiO_3$, $PbTiO_3$, $Pb[Zr_xTi_{1-x}]O_3$, $KNbO_3$, $LiNbO_3$, $LiTaO_3$, $Na_xWO_3$, $Ba_2NaNb_5O_5$, $Pb_2KNb_5O_{15}$, a polymer, polyvinyldene fluoride (PVDF), and lead-free piezoceramics.

23. The motor according to claim 21, wherein the at least one piezoelectric element layer comprises a first piezoelectric element layer and a second piezoelectric element layer attached on the first surface and the second surface of the hollowed plate, respectively,
wherein the first and the second piezoelectric element layers are disposed so that polarized pole arrangements of the first and the second piezoelectric element layers coincide, and are supplied with alternating voltages, which coincide in frequency and size, the alternating voltages having no time-phase difference.

24. The motor according to claim 23, wherein each of the first and the second piezoelectric element layers is divided into a first phase A and a second phase B, each of the first phase A and the second phase comprising positive and negative poles that are alternately polarized, the first phase A and the second phase B being disposed so that respective opposite ends of the first phase A and the second phase B have gaps of $\lambda/4$ and $3\lambda/4$ therebetween, wherein $\lambda$ is a length of one wavelength of a traveling wave in a circumferential direction.

25. The motor according to claim 21,
wherein the piezoelectric element layer comprises a first piezoelectric element layer and a second piezoelectric element layer attached on the first surface and the second surface of the hollowed plate, respectively,
wherein the first and the second piezoelectric element layers are disposed so that polarized pole arrangements the first and the second piezoelectric element layers have a spatial phase difference of $\lambda/4$ from each other, and are supplied with alternating voltages, which coincide in frequency and size, the alternating voltages having a time-phase difference of 90 degrees.

26. The motor according to claim 25, wherein each of the first and the second piezoelectric element layers have pole arrangements in which 2n polarized surfaces are alternately polarized as positive and negative poles, and wherein n is a number of wavelengths of a traveling wave produced in a circumferential direction.

27. The motor according to claim 17, wherein the projection part comprises a ring disposed on one of an inner circumferential surface and an outer circumferential surface of the hollowed plate, the ring comprising a plurality of projections formed on at least one of a first surface and a second surface of the ring.

28. The motor according to claim 27,
wherein the plurality of projections comprises a plurality of first projections and a plurality of second projections formed on the first and the second surfaces of the ring, respectively, and
wherein the plurality of first and the plurality of second projections are at least substantially same in size, number of projections and arrangement.

29. A conveying apparatus comprising:
an ultrasonic motor comprising a fixed member including a surface, a movable member rotatably positioned to face the surface of the fixed member, and an actuator to cause at least a portion of the movable member to contact the surface of the fixed member and cause the entire movable member to rotat as a whole relative to the fixed member; and
a motion converting unit connected with the ultrasonic motor, which converts a rotational motion of the movable member into a linear motion and transmits the linear motion to convey a device.

30. A conveying apparatus comprising:
an ultrasonic motor comprising a fixed member including a surface, a movable member rotatably positioned to face the surface of the fixed member, and an actuator to cause at least a portion of the movable member to contact the surface of the fixed member and cause the movable member to move relative to the fixed member; and
a motion converting unit connected with the ultrasonic motor, which converts a rotational motion of the movable member into a linear motion and transmits the linear motion to convey a device;
wherein the actuator comprises an electric field-converting element layer disposed on the movable member, which shapes the movable member into a traveling wave shape if the electric field-converting element layer is supplied with an electric power,
wherein the movable member comprises at least one vibrating element that is movable, the at least one vibrating element being deformable by the traveling wave shape, and
wherein the fixed member comprises at least one contact element fixedly disposed opposite to the at least one vibrating element to come in friction contact with the at least one vibrating element if the at least one vibrating element is deformed by the traveling wave shape.

31. The conveying apparatus according to claim 30, wherein the motion converting unit comprises:
a cam barrel coupled with the at least one vibrating element to rotate along with the at least one vibrating element and comprising a linear motion-guide slot; and
a guide projection connected to the device and coupled to the linear motion-guide slot.

32. The conveying apparatus according to claim 30, wherein the device comprises a focus lens disposed in a lens adaptor of a camera.

33. An ultrasonic motor comprising:
a first stator;
a second stator, the first and the second stators being substantially fixed;
a vibrating rotor disposed between the first and the second stators, the vibrating rotor comprising:
a plurality of projection members disposed at an outer edge of the vibrating rotor and opposingly disposed toward the first and the second stators;
a piezoelectric layer disposed between the plurality of projection members and a center of the vibrating rotor; and
an output shaft coupled to the vibrating rotor.

34. The motor according to claim 33, wherein the piezoelectric layer deforms the vibrating rotor so that the plurality of projection members are deformed into a traveling wave shape.

35. The motor according to claim 34, wherein one of the deformed plurality of projection members corresponding to a crest of the traveling wave shape is in contact with the first stator and another of the deformed plurality of projection members corresponding to a trough of the traveling wave shape is in contact with the second stator to cooperatively move the vibrating rotor with respect to the first and the second stators.

* * * * *